(12) United States Patent
Daijo

(10) Patent No.: US 8,515,274 B2
(45) Date of Patent: Aug. 20, 2013

(54) ILLUMINATION DEVICE AND CAMERA

(75) Inventor: Kazuhiro Daijo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/581,403

(22) PCT Filed: May 12, 2011

(86) PCT No.: PCT/JP2011/002642
§ 371 (c)(1),
(2), (4) Date: Aug. 27, 2012

(87) PCT Pub. No.: WO2011/148580
PCT Pub. Date: Dec. 1, 2011

(65) Prior Publication Data
US 2012/0321290 A1      Dec. 20, 2012

(30) Foreign Application Priority Data

May 25, 2010 (JP) .................................. 2010-119076

(51) Int. Cl.
*G03B 15/06* (2006.01)
(52) U.S. Cl.
USPC ............................. 396/199; 396/200; 362/16
(58) Field of Classification Search
USPC .................. 396/199, 200, 198; 362/3, 16
See application file for complete search history.

(56) References Cited

U.S. PATENT DOCUMENTS

| 7,486,885 B2 * | 2/2009 | Tenmyo ..................... 396/199 |
| 7,697,838 B2 * | 4/2010 | Tenmyo ..................... 396/200 |
| 2007/0159846 A1 | 7/2007 | Nishiyama et al. |

FOREIGN PATENT DOCUMENTS

| JP | 04-138439 A | 5/1992 |
| JP | 2002-131809 | 5/2002 |
| JP | 2007-188681 A | 7/2007 |

OTHER PUBLICATIONS

International Search Report for PCT/JP2011/002642 dated Jun. 7, 2012.

* cited by examiner

*Primary Examiner* — Christopher Mahoney
(74) *Attorney, Agent, or Firm* — RatnerPrestia

(57) ABSTRACT

An illumination device including a light guide unit in which an optical path through which light propagates is formed in an annular shape such that the light propagating in the optical path is emitted from a front surface side of the light guide unit; a local reflection unit provided on the rear surface side of the light guide unit such that light is emitted from only a portion of the front surface side of the light guide unit; and a light source that moves between the light guide unit and the local reflection unit. When the light source is positioned on the light guide unit side, light output from the light source propagates in the optical path of the light guide unit and is emitted from the front surface side in an annular shape. When the light source is positioned on the local reflection unit side, the light output from the light source is reflected by the local reflection unit and emitted in a concentrated manner from only the portion on the front surface side of the light guide unit.

10 Claims, 19 Drawing Sheets

ILLUMINATION DEVICE AND CAMERA

This is application is a U.S. National Phase Application of PCT International Application PCT/JP2011/002642.

TECHNICAL FIELD

The present invention relates to an illumination device used in, for example, photographing and to a camera into which the illumination device is incorporated. More specifically, the present invention relates to an illumination device capable of carrying out illumination by switching between illumination for long distance photography and illumination for short distance photography, and to a camera into which the illumination device is incorporated.

BACKGROUND ART

In general, a camera such as a digital still camera incorporates an illumination device for providing a subject with a sufficient amount of light. For example, Patent Literature 1 describes a camera in which light irradiation conditions are allowed to be easily switched between normal long distance photography and short distance photography.

As shown in FIG. 20, the camera includes photographing lens 2 provided in camera main body 1, flash light emitting unit 3 provided on camera main body 1 to be capable of appearing on camera main body 1, and diffusion unit 4 for diffusing emitted flash light to a subject in a state in which flash light emitting unit 3 is stored in camera main body 1. Diffusion unit 4 includes diffusion member 5 provided in the vicinity of the outer periphery of photographing lens 2, and light guide unit 6 for guiding flash light from flash light emitting unit 3 to diffusion member 5.

This camera enables long distance flash photography by allowing flash light emitting unit 3 to be projected from camera main body 1, and enables short distance flash photography by allowing flash light emitting unit 3 to emit light in a state in which flash light emitting unit 3 is stored in camera main body 1. Flash light emitting unit 3 stored in camera main body 1 irradiates a subject with flash light diffused by diffusion unit 4. Accordingly, this camera is configured to illuminate the subject uniformly even if camera main body 1 is allowed to approach the subject.

The camera described in Patent Literature 1 is configured such that flash light emitting unit 3 can be allowed to appear on camera main body 1 to switch between flush light for long distance photography and flush light for short distance photography. However, in order to allow flash light emitting unit 3 to appear on camera main body 1, a complicated mechanism is required, thus increasing cost of a camera. Furthermore, a space for light guide unit 6 is required according to a portion of the mechanism, thus making it difficult to reduce the size.

CITATION LIST

Patent Literature

PTL 1: Japanese Patent Unexamined Publication No. 2002-131809

SUMMARY OF THE INVENTION

An illumination device of the present invention includes a light guide unit in which an optical path through which light propagates is formed in an annular shape such that the light propagating through the optical path is emitted from a front surface side of the light guide unit; a local reflection unit provided on at least a rear surface side of the light guide unit such that light is emitted from only a portion of the front surface side of the light guide unit; and a light source which moves between the light guide unit and the local reflection unit. When the light source is positioned on the light guide unit side, the light output from the light source propagates in the optical path of the light guide unit and is annularly emitted from the front surface side. When the light source is positioned on the local reflection unit side, the light output from the light source is reflected by the local reflection unit and emitted in a concentrated manner from only the portion on the front surface side of the light guide unit.

With this illumination device, the light source can move between the light guide unit and the local reflection unit. When light from the light source positioned on the light guide unit side is allowed to propagate to the entire periphery of the light guide unit, the light is annularly emitted from the front surface side of the light guide unit. When light from the light source positioned on the local reflection unit is reflected by only the local reflection unit, the light is emitted from only a portion on the front surface side in a concentrated manner. Note here that the light emitted from only the portion on the front surface side in a concentrated manner can reach a more distant place than the light emitted annularly from the front surface side.

DETAILED DESCRIPTION OF THE PREFERRED EMBODIMENT

First Exemplary Embodiment

Figure 1A:
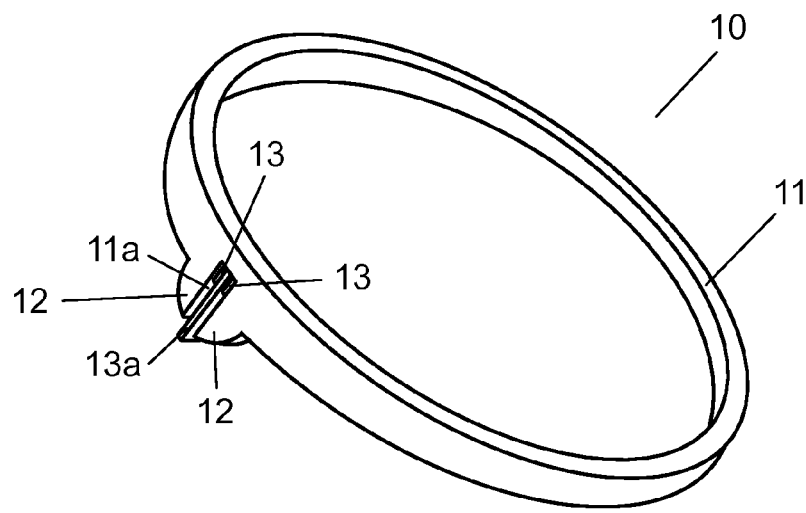
FIG. 1A is a perspective view of an illumination device seen from a front surface side when light is annularly emitted in accordance with a first exemplary embodiment of the present invention.

An illumination device in accordance with a first exemplary embodiment of the present invention is described with reference to FIGS. 1 to 6. Illumination device 10 includes light guide unit 11 in which an optical path through which light propagates is formed in an annular shape; local reflection unit 12 for emitting light from only a portion on a front surface side (an upper surface side in the drawings) of light guide unit 11; and light source 13 that moves between light guide unit 11 and local reflection unit 12.

Light guide unit 11 is formed of a transparent resin in a ring shape. Light guide unit 11 is made to be thinner as a distance from light source 13 is larger such that light output from light source 13 provided in one portion is output uniformly, and the light propagates to the opposite side apart from light source 13 while the light is refracted in the optical path with a part of the light emitted from the front surface, that is to say, the light is reflected on a rear surface side.

However, a rear surface (a lower surface in the drawings) of light guide unit 11 may further be provided with a reflector, for example, by forming concave portions or convex portions having a saw-tooth shape or various shapes, although not shown, or by loading a mirror surface sheet. Note here that light guide unit 11 may be provided with only the reflector without being made to be thinner as the distance from light source 13 is larger.

Light guide unit 11 is provided with groove-shaped space portion 11a, in which light source 13 is placed, from the rear surface side. Space portion 11a may be formed in a hole shape or may be provided in such a manner that it completely divides light guide unit 11, although not shown. In any case, when light guide unit 11 is made to be thinner as the distance from light source 13 is larger, space portion 11a is provided in a site having the largest thickness.

A pair of local reflection units 12 are provided on both sides of space portion 11a, that is to say, provided by an expanded reflection unit integrally expanded from the rear surface such that they sandwich space portion 11a. The rear surface side (a lower surface side in the drawings) of the expanded reflection unit is formed in a curved shape that swells outward or an inclined surface (not shown). Since the pair of local reflection units 12 are provided on both sides of space portion 11a, a space portion is provided also between local reflection units 12. Note here that the above-mentioned reflector may be provided on the peripheral surface of local reflection unit 12.

Light source 13 includes two LEDs which are fixed to the both surfaces of a tip end portion of substrate 13a. On a base end portion of substrate 13a, a general mechanism (not shown) for allowing substrate 13a to reciprocate is provided such that light source 13 is allowed to reciprocate between a deep side and an opening side of space portion 11a.

Figure 3A:
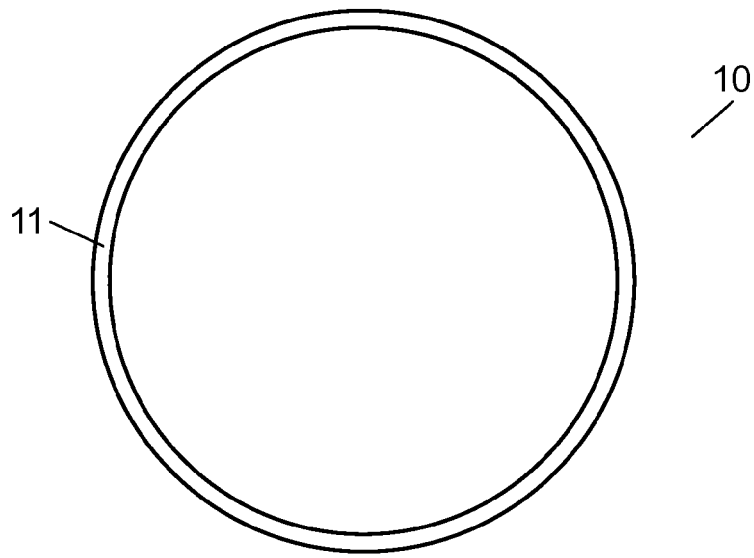
FIG. 3A is a plan view showing a principal part of the illumination device in accordance with the first exemplary embodiment of the present invention.
Figure 3B:
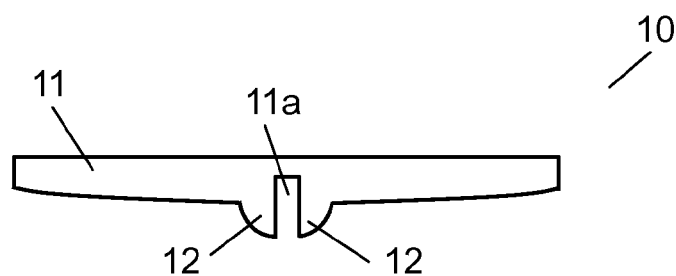
FIG. 3B is a front view showing the principal part of the illumination device in accordance with the first exemplary embodiment of the present invention.
Figure 3C:
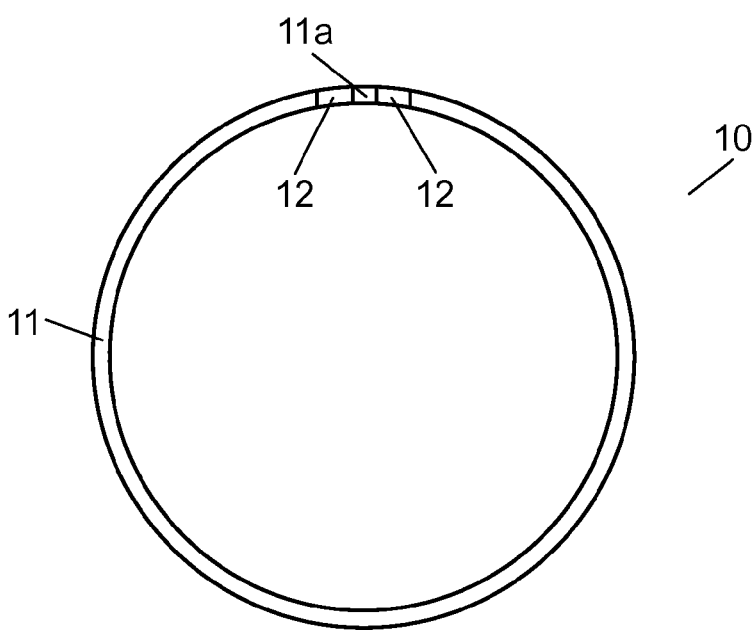
FIG. 3C is a bottom view showing the principal part of the illumination device in accordance with the first exemplary embodiment of the present invention.
Figure 4A:
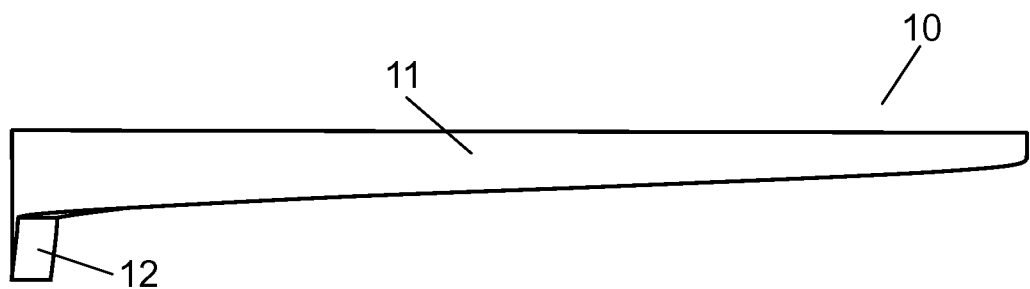
FIG. 4A is a right side view showing the principal part of the illumination device in accordance with the first exemplary embodiment of the present invention.
Figure 4B:
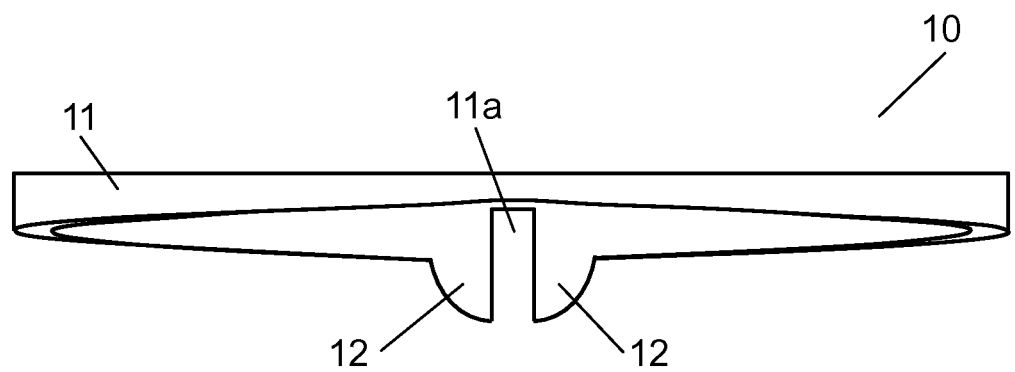
FIG. 4B is a rear view showing the principal part of the illumination device in accordance with the first exemplary embodiment of the present invention.

Note here that light guide unit 11 and local reflection unit 12 in illumination device 10 in the first exemplary embodiment are shown in the plan view, the front view, and the bottom view in FIGS. 3A, 3B, and 3C, and shown in the right side view and the rear view in FIGS. 4A and 4B.

Figure 2A:
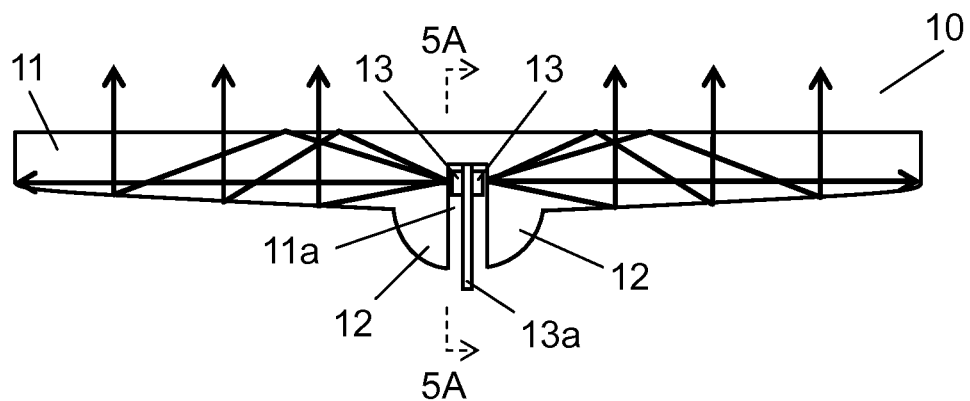
FIG. 2A is a front view schematically showing an optical path when light is annularly emitted in the illumination device in accordance with the first exemplary embodiment of the present invention.
Figure 5A:
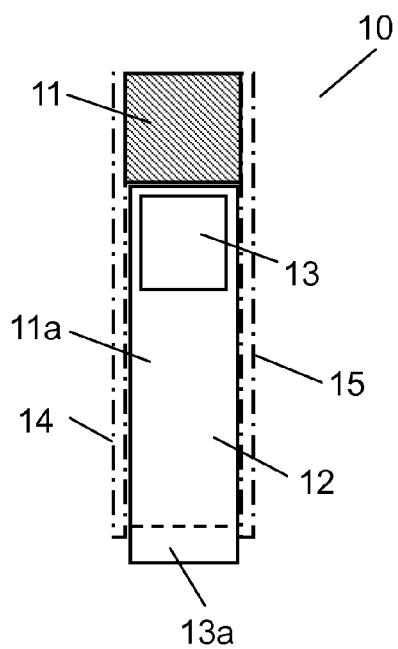
FIG. 5A is a sectional end view taken along line 5A-5A of FIG. 2A in accordance with the first exemplary embodiment of the present invention.

Herein, an illumination mode of illumination device 10 of the first exemplary embodiment is described. As shown in FIGS. 1A, 2A, and 5A, when light source 13 is positioned in a deep side (an upper side in the drawings) of space portion 11a, light output from light source 13 propagates over the entire periphery in light guide unit 11, is reflected by the rear surface of light guide unit 11, and the like, and then is annularly emitted from the front surface side of light guide unit 11. Furthermore, since the light output from light source 13 is not reflected by local reflection unit 12, it is not emitted in a concentrated manner.

Figure 1B:
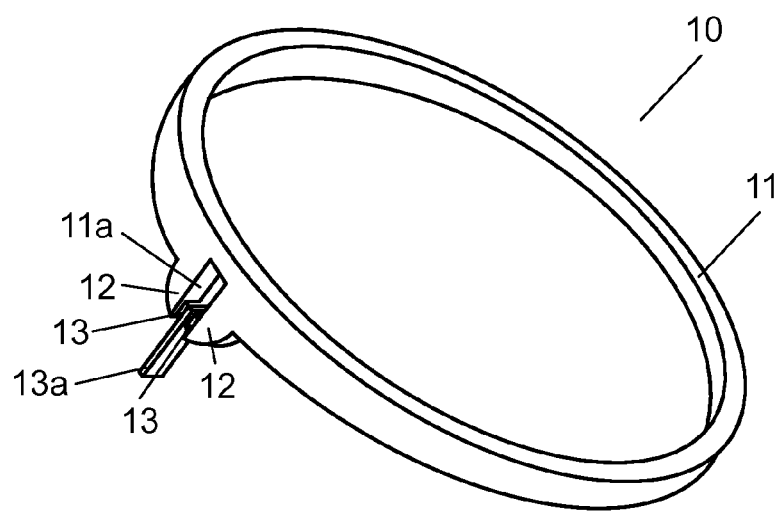
FIG. 1B is a perspective view of the illumination device seen from the front surface side when light is emitted in a concentrated manner in accordance with the first exemplary embodiment of the present invention.
Figure 2B:
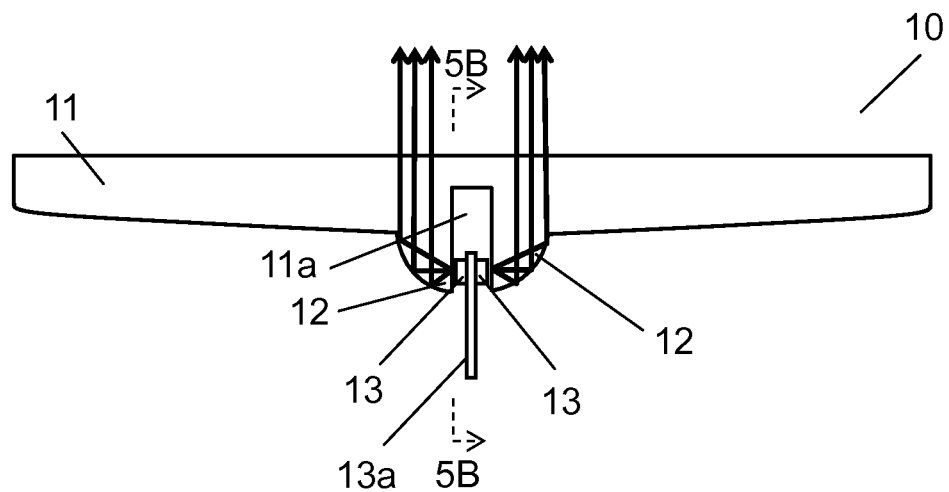
FIG. 2B is a front view schematically showing the optical path when light is emitted in a concentrated manner in the illumination device in accordance with the first exemplary embodiment of the present invention.
Figure 5B:
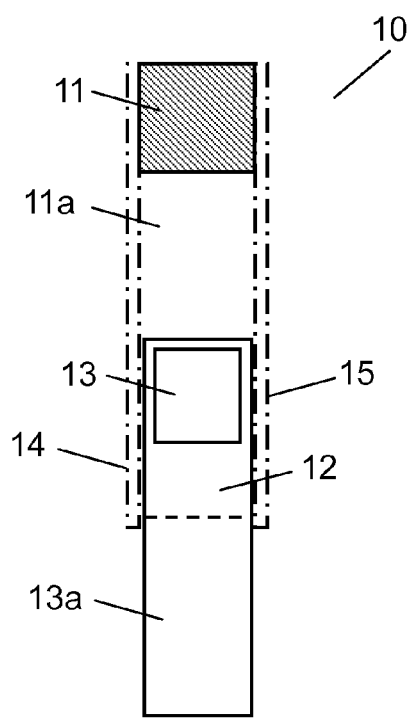
FIG. 5B is a sectional end view taken along line 5B-5B of FIG. 2B in accordance with the first exemplary embodiment of the present invention.

As shown in FIGS. 1B, 2B and 5B, when light source 13 is positioned on an opening side (a lower side in the drawings) of space portion 11a, the light output from light source 13 is reflected by local reflection unit 12, and emitted in a concentrated manner from the front surface side of light guide unit 11. Furthermore, since the light output from light source 13 does not propagate in light guide unit 11, it is not annularly emitted.

In this way, illumination device 10 emits light annularly or emits light in a concentrated manner depending upon whether light source 13 is positioned on the deep side or on the opening side of space portion 11a.

Figure 6:
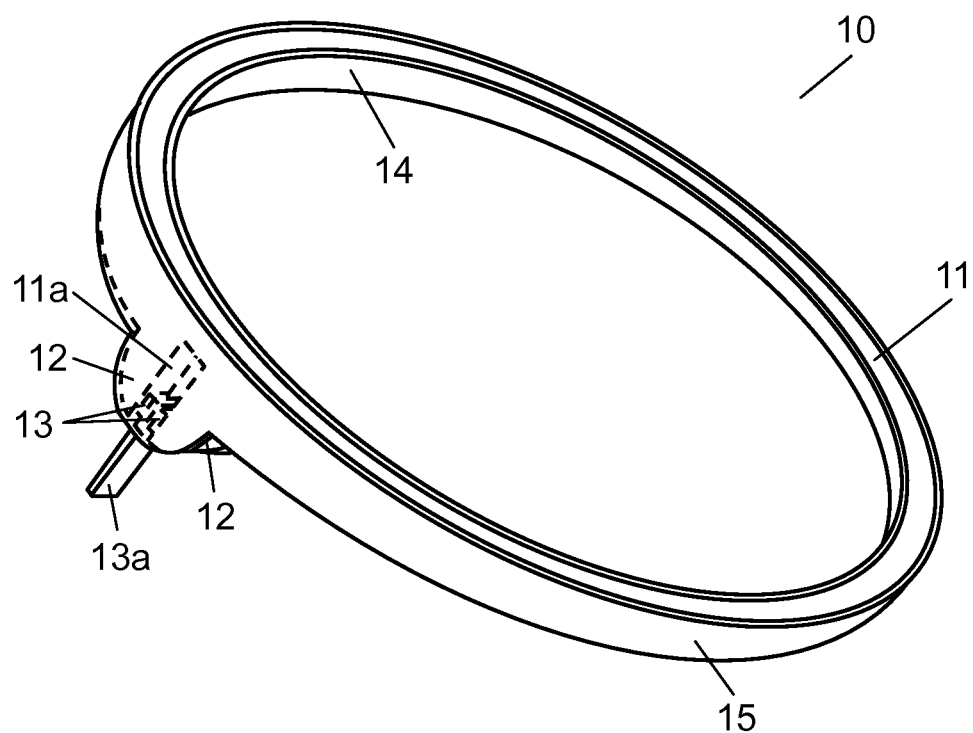
FIG. 6 is a perspective view of a modified example of the illumination device seen from the front surface side in accordance with the first exemplary embodiment of the present invention.

Note here that as shown by virtual lines in FIGS. 5A and 5B and FIG. 6, in illumination device 10, annular peripheral surface reflection members 14 and 15 may be provided on an inner peripheral surface and an outer peripheral surface of light guide unit 11 and local reflection unit 12, or annular peripheral surface reflection members 14 and 15 may be provided on any one of the surfaces although not shown. With peripheral surface reflection members 14 and 15, light in the direction emitted from the inner peripheral surface and the outer peripheral surface of light guide unit 11 and local reflection unit 12 can be reflected to the inside. Note here that inner peripheral surface reflection member 14 and outer peripheral surface reflection member 15 are made to have a similar form and the same thickness, but they may have different thicknesses. Furthermore, the peripheral surface reflection members on the inner side, the outer side and on the rear surface may be integrally formed. Alternatively, a reflecting film may be provided by subjecting metal to vapor deposition instead of providing the peripheral surface reflection member.

Second Exemplary Embodiment

An illumination device in accordance with a second exemplary embodiment of the present invention is described with reference to FIGS. 7A to 12B. Illumination device 20 includes light guide unit 21 in which an optical path through which light propagates is formed in an annular shape; local reflection unit 22 for emitting light from only a portion on a front surface side (an upper surface side in the drawings) of light guide unit 21; and light source 23 that moves between light guide unit 21 and local reflection unit 22.

Figure 7A:
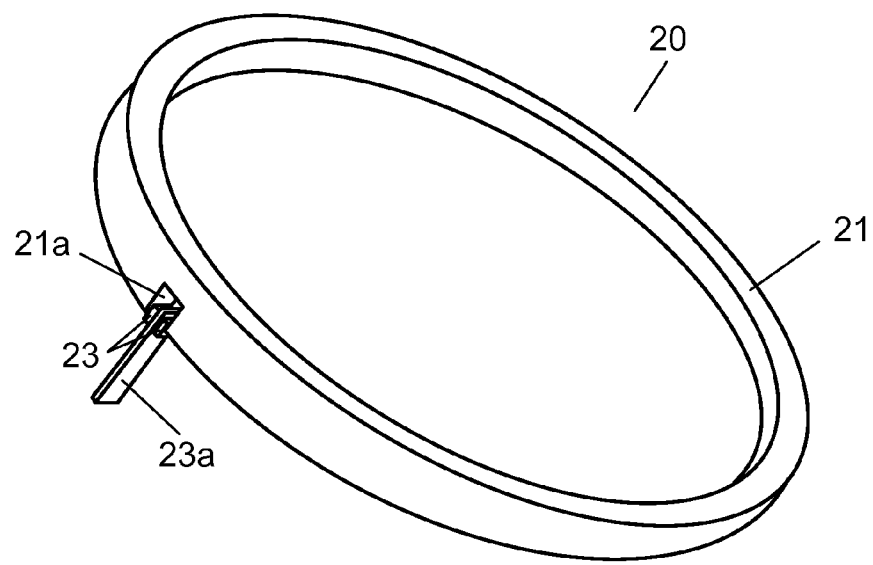
FIG. 7A is a perspective view of an illumination device seen from a front surface side in a state in which a peripheral surface reflection member is not provided in accordance with a second exemplary embodiment of the present invention.

As in the first exemplary embodiment, as shown in FIG. 7A, light guide unit 21 is formed of a transparent resin in a ring shape. Light guide unit 21 is made to be thinner as a distance from light source 23 is larger such that light output from light source 23 provided in one portion propagates to the opposite side apart from light source 23 while the light is refracted in the optical path with a part of the light emitted from the front surface, that is to say, the light is reflected on a rear surface side (a lower surface side in the drawings).

Furthermore, the rear surface of light guide unit 21 may further be provided with a reflector, for example, by forming concave portions or convex portions having a saw-tooth shape or various shapes, by loading a mirror surface sheet, or the like. Note here that light guide unit 21 may be provided with only the reflector without being made to be thinner as the distance from light source 23 is larger.

Light guide unit 21 is provided with groove-shaped space portion 21a in which light source 23 is placed. Light guide unit 21 is provided from the rear surface side. Space portion 21a may be formed in a hole shape or may be provided in such a manner that it completely divides light guide unit 21, although not shown. In any case, when light guide unit 21 is made to be thinner as the distance from light source 23 is larger, space portion 21a is provided in a site having the largest thickness.

Figure 10A:
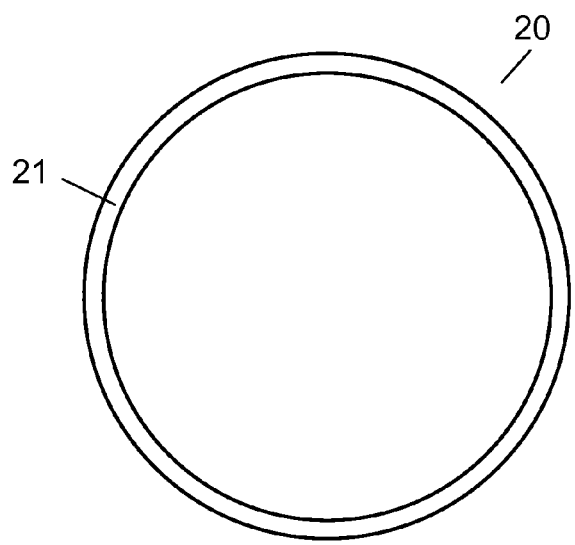
FIG. 10A is a plan view showing a light guide unit of the illumination device in accordance with the second exemplary embodiment of the present invention.
Figure 10B:
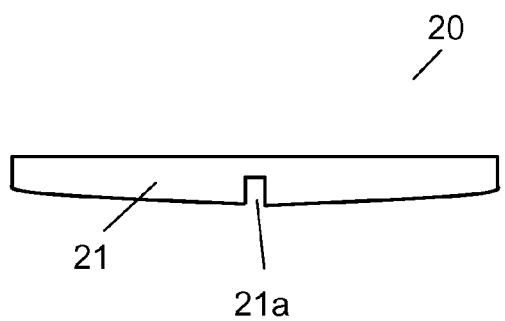
FIG. 10B is a front view showing the light guide unit of the illumination device in accordance with the second exemplary embodiment of the present invention.
Figure 10C:
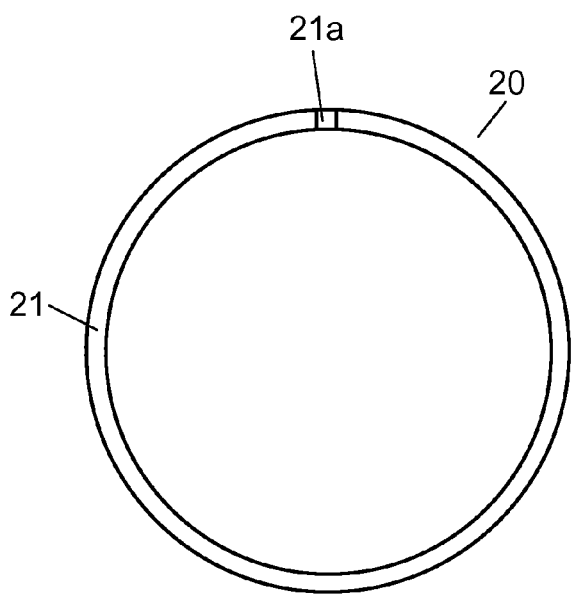
FIG. 10C is a bottom view showing the light guide unit of the illumination device in accordance with the second exemplary embodiment of the present invention.
Figure 11A:
FIG. 11A is a right side view showing the light guide unit of the illumination device in accordance with the second exemplary embodiment of the present invention.
Figure 11B:
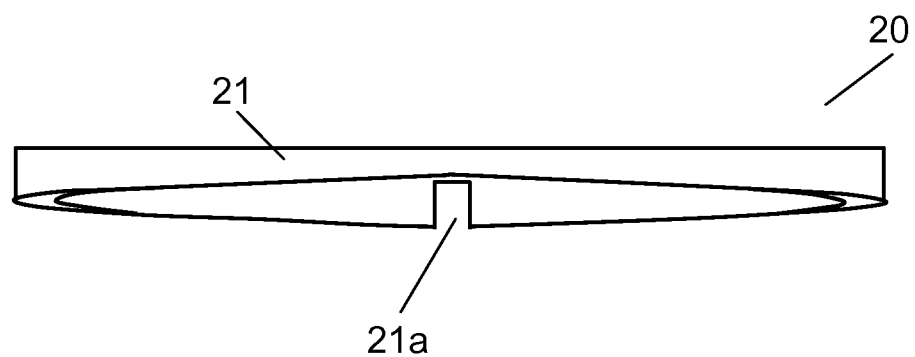
FIG. 11B is a rear view showing the light guide unit of the illumination device in accordance with the second exemplary embodiment of the present invention.

Such light guide unit 21 is shown in the plan view, the front view, and the bottom view in FIGS. 10A, 10B, and 10C, and shown in the right side view and the rear view in FIGS. 11A and 11B.

Then, as in the first exemplary embodiment, light source 23 that is placed in space portion 21a includes two LEDs which are fixed to the both surfaces of a tip end portion of substrate 23a. On a base end portion of substrate 23a, a general mechanism (not shown) for allowing substrate 23a to reciprocate is provided such that light source 23 is allowed to reciprocate between a deep side and an opening side of space portion 21a.

Unlike the first exemplary embodiment, local reflection unit 22 is provided by a pair of plate-like reflection members (hereinafter, referred to as "plate-like reflection member 22") as a different member from light guide unit 21. Plate-like reflection member 22 is formed in a linear shape that inclined so as to be most apart in a site facing space portion 21a of light guide unit 21, or in an arc shape that swells outward (not shown). Furthermore, between the pair of plate-like reflection members 22, an interval is formed and substrate 23a of light source 23 penetrates therethrough. A space is provided between plate-like reflection members 22 and light guide unit 21.

Rear surface reflection member 26 continuously connected to the pair of plate-like reflection members 22 is loaded (attached) on the rear surface of light guide unit 21. The pair of plate-like reflection members 22 and rear surface reflection member 26 are integrally molded. However, rear surface reflection member 26 may be provided as a different member from the pair of plate-like reflection members 22, or may not be provided when a reflector such as a saw-tooth shape mentioned above is provided.

Figure 7B:
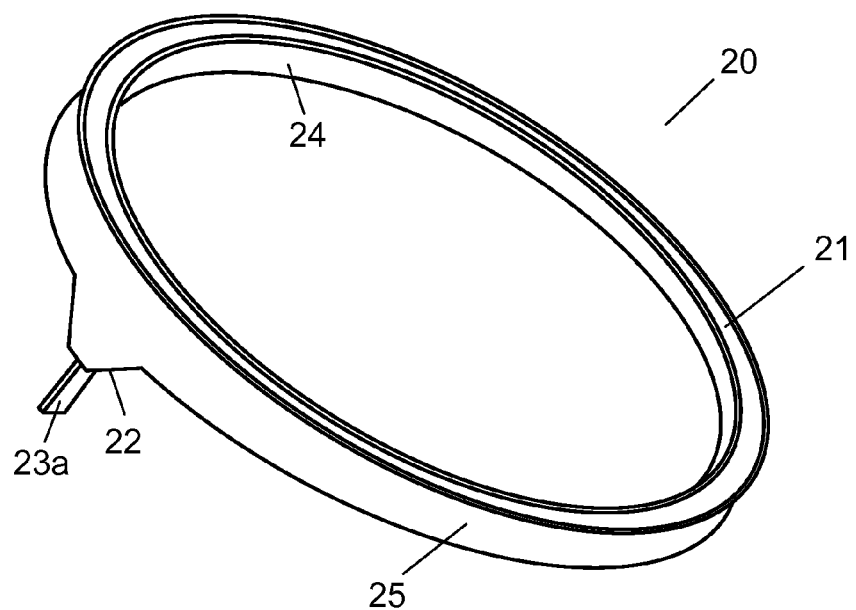
FIG. 7B is a perspective view of the illumination device seen from a front surface side in a state in which the peripheral surface reflection member is provided in accordance with the second exemplary embodiment of the present invention.
Figure 8:
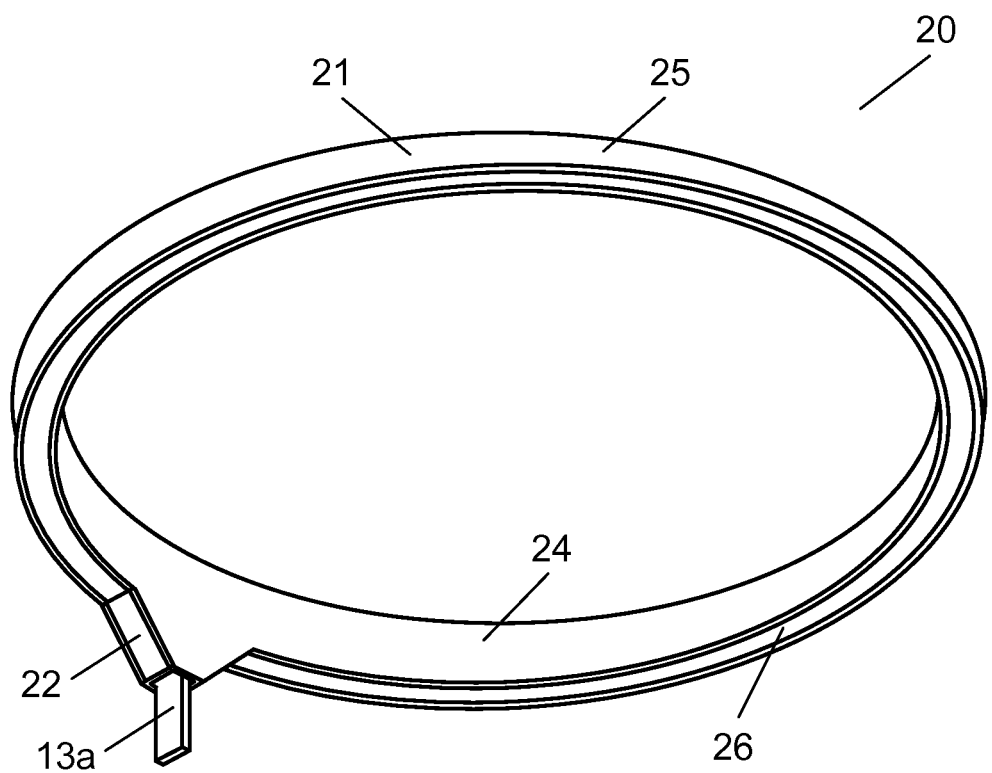
FIG. 8 is a perspective view showing the illumination device seen from a rear surface side in accordance with the second exemplary embodiment of the present invention.

In any case, as shown in FIG. 7B, annular peripheral surface reflection members 24 and 25 are provided on an inner peripheral surface and an outer peripheral surface of light guide unit 21 and local reflection unit 22. The width of peripheral surface reflection members 24 and 25 is widened in a site in which local reflection unit 22 is provided. Accordingly, inner and outer peripheral surface reflection members 24 and 25 are disposed so as to sandwich plate-like reflection member 22 and rear surface reflection member 26 on the rear surface side edges. In other words, plate-like reflection member 22 is held by the widened parts of inner and outer peripheral surface reflection members 24 and 25. Note here that inner and outer peripheral surface reflection members 24 and 25 may be disposed such that end surface of the reflection member is brought into contact with the surfaces of plate-like reflection member 22 and rear surface reflection member 26 instead of taking a configuration in which inner and outer peripheral surface reflection members 24 and 25 sandwich plate-like reflection member 22 and rear surface reflection member 26. Furthermore, inner peripheral surface reflection member 24 and outer peripheral surface reflection member 25 are made to have a similar form and the same thickness, but they may have different thicknesses. Furthermore, the peripheral surface reflection members on the inner side, the outer side and on the rear surface may be integrally formed. Alternatively, a reflecting film may be provided by subjecting metal to vapor deposition instead of providing the peripheral surface reflection member.

Figure 9A:
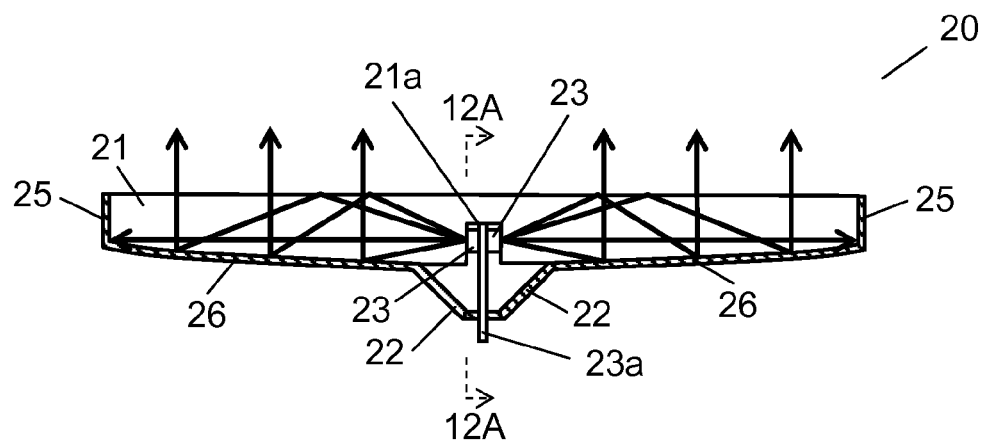
FIG. 9A is a front view schematically showing an optical path when light is annularly emitted in the illumination device in accordance with the second exemplary embodiment of the present invention.
Figure 12A:
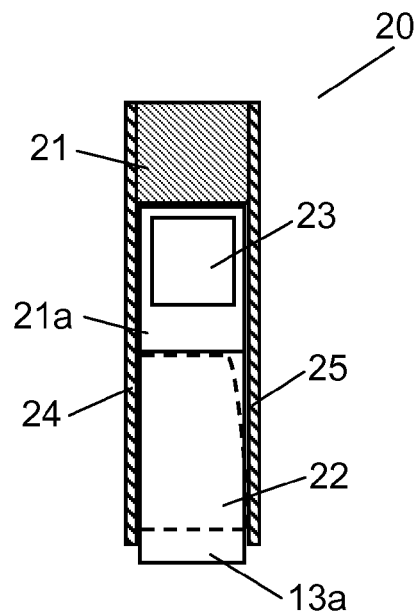
FIG. 12A is a sectional end view taken along line 12A-12A of FIG. 9A in accordance with the second exemplary embodiment of the present invention.

Herein, an illumination mode of illumination device 20 of the second exemplary embodiment is described. As shown in FIGS. 9A and 12A, when light source 23 is positioned in a deep side (an upper side in the drawings) of space portion 21a, light output from light source 23 propagates over the entire periphery in light guide unit 21, is reflected by the rear surface of light guide unit 21, and the like, and then is annularly emitted from the front surface side of light guide unit 21. Furthermore, since the light output from light source 23 is not reflected by local reflection unit 22, it is not emitted in a concentrated manner.

Figure 9B:
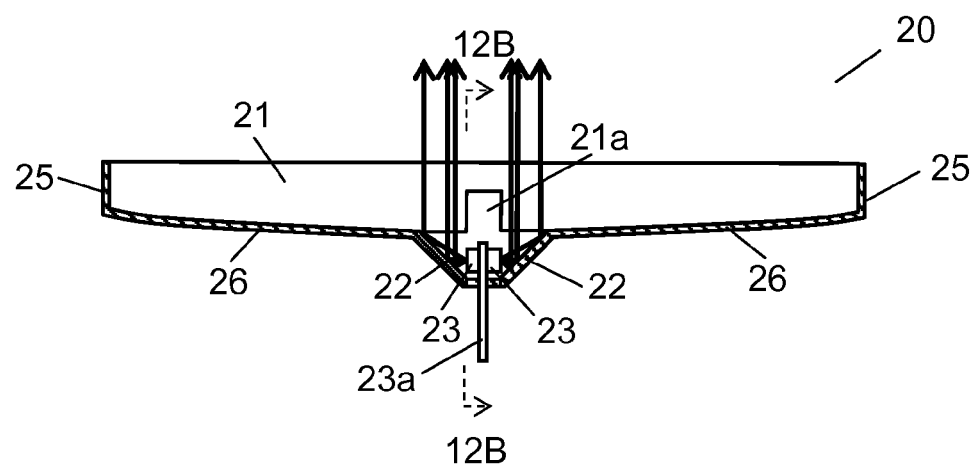
FIG. 9B is a front view schematically showing the optical path when light is emitted in a concentrated manner in the illumination device in accordance with the second exemplary embodiment of the present invention.
Figure 12B:
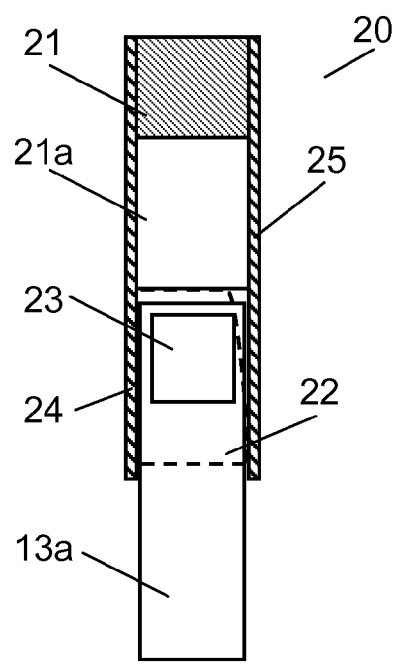
FIG. 12B is a sectional end view taken along line 12B-12B of FIG. 9B in accordance with the second exemplary embodiment of the present invention.

As shown in FIGS. 9B and 12B, when light source 23 is positioned on an opening side (a lower side in the drawings) of space portion 21a, the light output from light source 23 is reflected by plate-like reflection member 22, and emitted in a concentrated manner from the front surface side of light guide unit 21. Furthermore, since the light output from light source 23 does not propagate in light guide unit 21, it is not annularly emitted.

In this way, illumination device 20 emits light annularly or emits light in a concentrated manner depending upon whether light source 23 is positioned on a deep side of space portion 21a or positioned on an opening side.

Third Exemplary Embodiment

An illumination device in accordance with a third exemplary embodiment of the present invention is described with reference to FIGS. 13A to 18B. Illumination device 30 includes light guide unit 31 in which an optical path through which light propagates is formed in an annular shape; local reflection unit 32 for emitting light from only a portion on a front surface side (an upper surface side in the drawings) of light guide unit 31; and light source 33 that moves between light guide unit 31 and local reflection unit 32.

Light guide unit 31 is formed of a transparent resin in substantially a ring shape. That is to say, light guide unit 31 is provided with space portion 31a that is completely divided in a site in which light source 33 is disposed. Note here that space portion 31a in the third exemplary embodiment may be formed in a groove shape or a hole shape.

Light guide unit 31 is also made to be thinner as a distance from light source 33 is larger such that light output from light source 33 provided in one portion propagates to the opposite side apart from light source 33 while the light is refracted in the optical path with a part of the light emitted from the surface, that is, such that the light is reflected at a rear surface side (a lower surface side in the drawings).

Furthermore, the rear surface of light guide unit 31 may further be provided with a reflector, for example, by forming concave portions or convex portions having a saw-tooth shape or various shapes, by loading a mirror surface sheet, or the like. Note here that light guide unit 31 may be provided with only a reflector without being made to be thinner as the distance from light source 33 is larger.

Local reflection unit 32 includes a pair of plate-like reflection members 32a as those provided in illumination device 20 of the second exemplary embodiment, and block-like movable reflection member 32b that reciprocates in space portion 31a of light guide unit 31. The pair of plate-like reflection members 32a are provided as different members from light guide unit 31 and continuously connected to space portion 31a, which are provided with an interval for sandwiching movable reflection member 32b. Furthermore, the pair of plate-like reflection members 32a shown in the drawing are formed in a curved shape that swells outward, but may be formed in an inclined surface shape.

Rear surface reflection member 36 continuously connected to pair of plate-like reflection members 32a is loaded on the rear surface of light guide unit 31. The pair of plate-like reflection members 32a and rear surface reflection member 36 are integrally molded. However, rear surface reflection member 36 may be provided as a different member from the pair of plate-like reflection members 32a, or may not be provided when a reflector such as saw-tooth shapes mentioned above is provided.

Furthermore, movable reflection member 32b has a front surface shape having a V shape (not shown) or a curved surface shape having a pair of curved surface portions swelling toward the front surface side (as shown in the drawings). One LED as light source 33 is fixed on the rear surface of movable reflection member 32b, and light output from the LED is allowed to travel toward the front surface side of movable reflection member 32b.

Annular peripheral surface reflection members 34 and 35 are provided on the inner peripheral surface and the outer peripheral surface of light guide unit 31 and local reflection unit 32. The annular peripheral surface reflection members 34 and 35 are provided so as to sandwich movable reflection member 32b of local reflection unit 32 in a state in which movable reflection member 32b can reciprocate in a site that covers space portion 31a of light guide unit 31. Furthermore, the width is increased like a bathtub shape that sandwiches plate-like reflection member 32a of local reflection unit 32. Accordingly, inner and outer peripheral surface reflection members 34 and 35 are disposed on the rear surface side edge so as to sandwich plate-like reflection member 32a of local reflection unit 32 and rear surface reflection member 36. Note here that inner and outer peripheral surface reflection members 34 and 35 may be disposed such that end surface of the reflection member is brought into contact with the surfaces of plate-like reflection member 32a and rear surface reflection member 36 instead of taking a configuration in which inner and outer peripheral surface reflection members 34 and 35 sandwich plate-like reflection member 32a and rear surface reflection member 36. Furthermore, inner peripheral surface reflection member 34 and outer peripheral surface reflection member 35 are made to have a similar form and the same thickness, but they may have different thicknesses. Furthermore, the peripheral surface reflection members on the inner side, the outer side and on the rear surface may be integrally formed. Alternatively, a reflecting film may be provided by subjecting metal, and the like to vapor deposition instead of providing the peripheral surface reflection member.

Figure 15A:
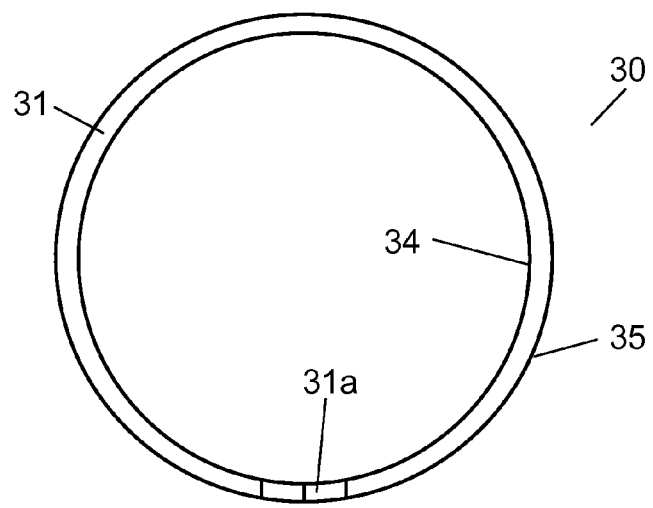
FIG. 15A is a plan view showing the illumination device in accordance with the third exemplary embodiment of the present invention.
Figure 15B:
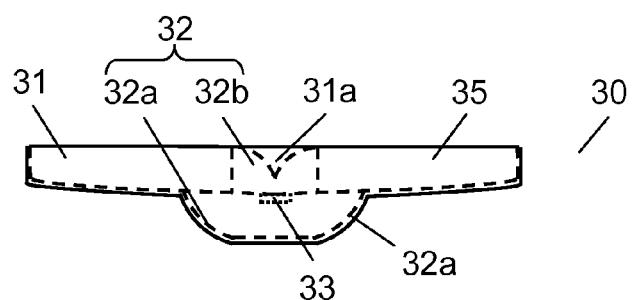
FIG. 15B is a front view showing the illumination device in accordance with the third exemplary embodiment of the present invention.
Figure 15C:
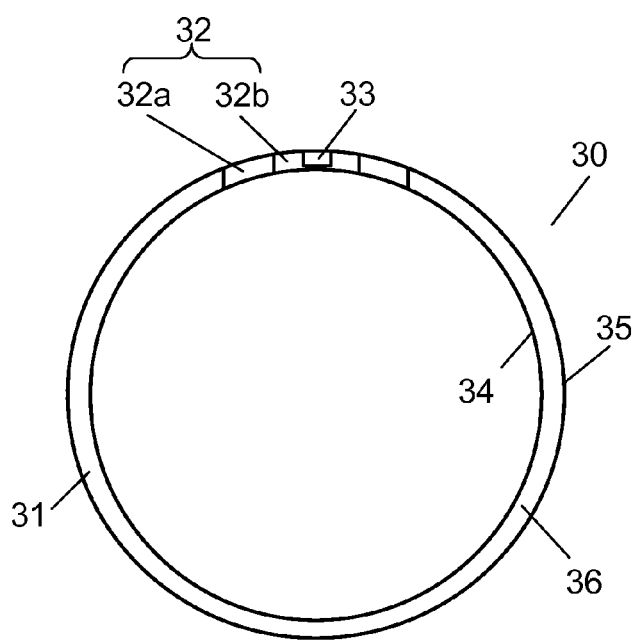
FIG. 15C is a bottom view showing the illumination device in accordance with the third exemplary embodiment of the present invention.
Figure 16A:
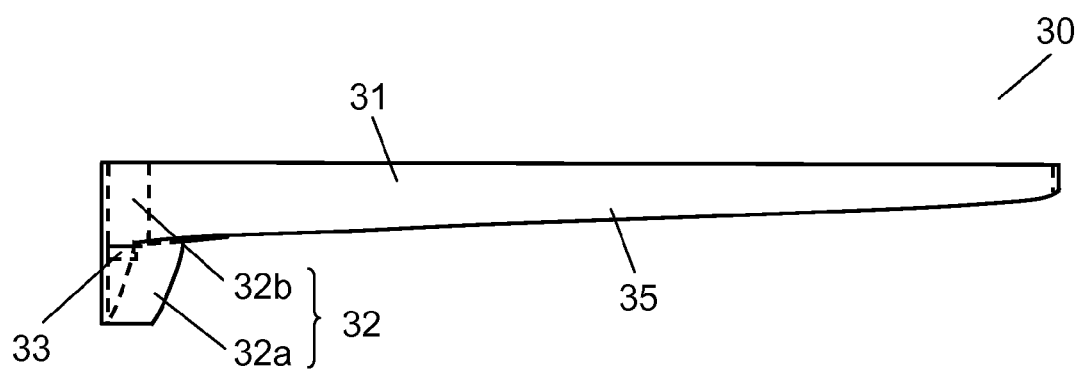
FIG. 16A is a right side view showing the illumination device in accordance with the third exemplary embodiment of the present invention.
Figure 16B:
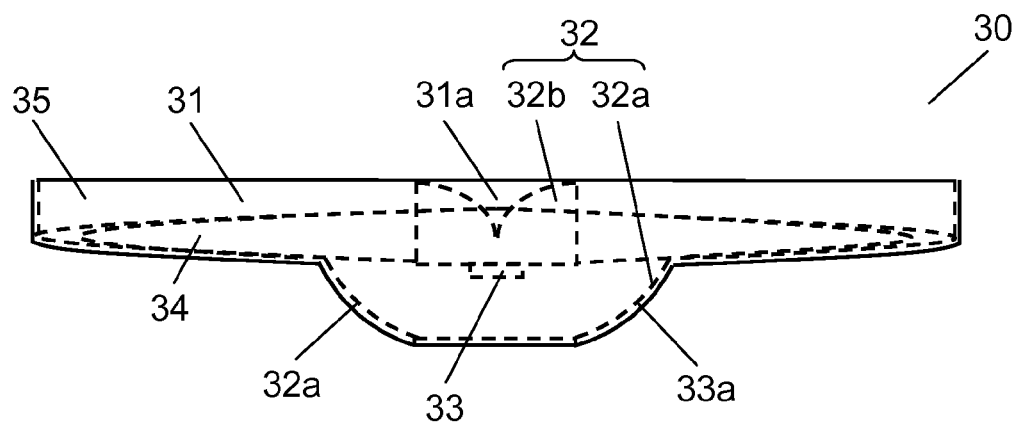
FIG. 16B is a rear view showing the illumination device in accordance with the third exemplary embodiment of the present invention.

Such illumination device 30 is shown in the plan view, the front view, and the bottom view in FIGS. 15A, 15B, and 15C, and shown in a right side view and a rear view in FIGS. 16A and 16B.

Figure 13A:
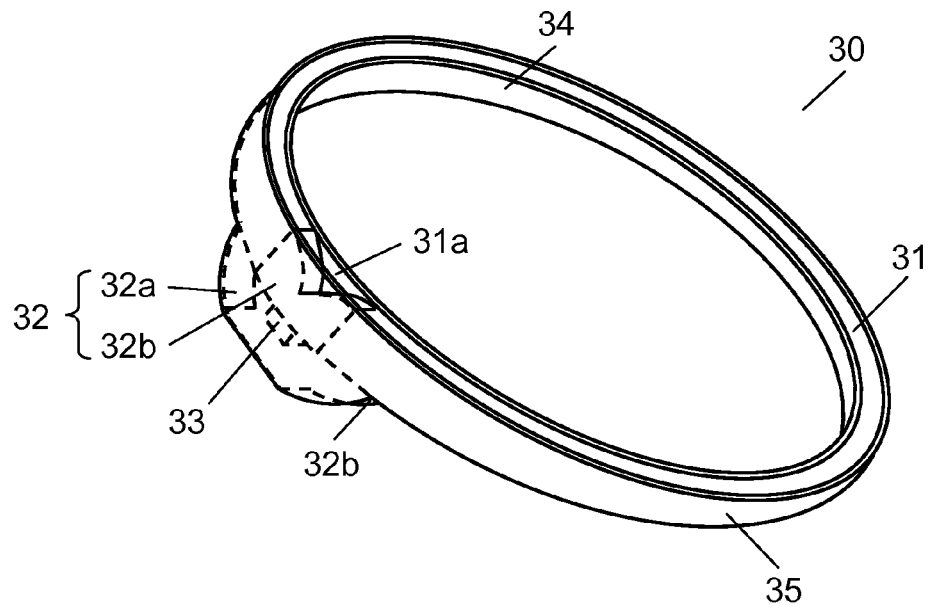
FIG. 13A is a perspective view of an illumination device seen from a front surface side when light is annularly emitted in accordance with a third exemplary embodiment of the present invention.
Figure 14A:
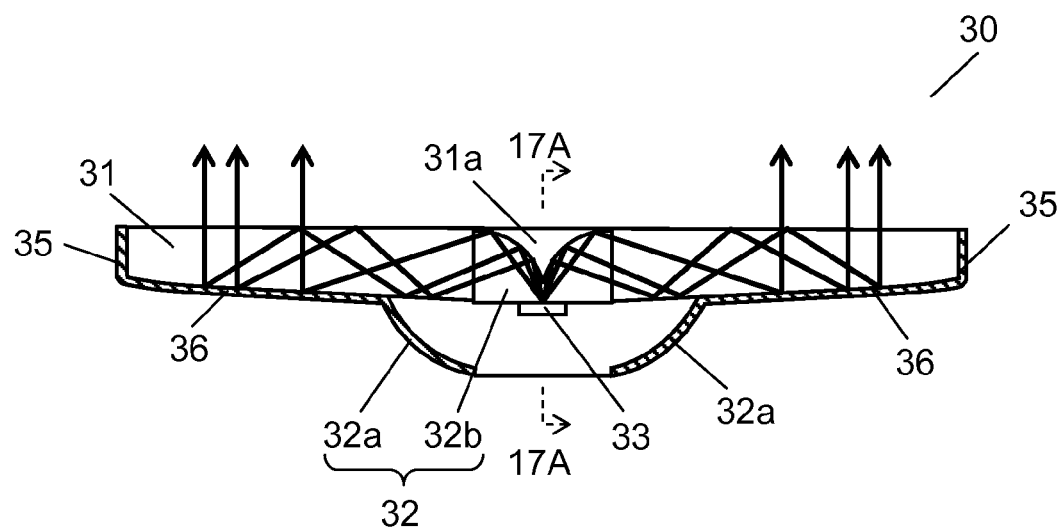
FIG. 14A is a front view schematically showing an optical path when light is annularly emitted in the illumination device in accordance with the third exemplary embodiment of the present invention.
Figure 17A:
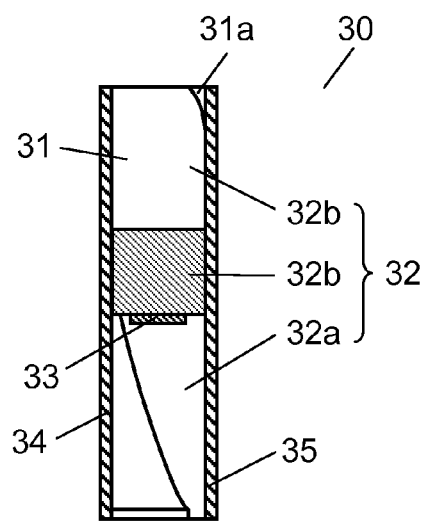
FIG. 17A is a sectional end view taken along line 17A-17A of FIG. 14A in accordance with the third exemplary embodiment of the present invention.

Herein, an illumination mode of illumination device 30 of the third exemplary embodiment is described. As shown in FIGS. 13A, 14A and 17A, when light source 33 and movable reflection member 32b of local reflection unit 32 are positioned on a front surface side (an upper side in the drawings) of light guide unit 31 in space portion 31a, light output from light source 33 is reflected by the surface of movable reflection member 32b, propagates over the entire periphery of light guide unit 31, is reflected by a rear surface of light guide unit 31, and the like, and then is emitted annularly from the front surface side of light guide unit 31. Furthermore, since the light output from light source 33 is not reflected by plate-like reflection member 32a of local reflection unit 32, it is not emitted in a concentrated manner.

Figure 13B:
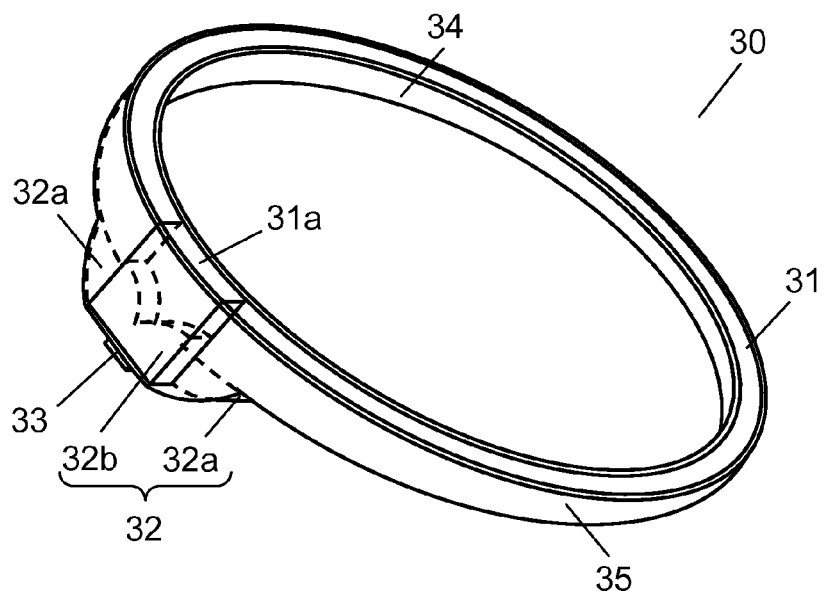
FIG. 13B is a perspective view of the illumination device seen from the front surface side when light is emitted in a concentrated manner in accordance with the third exemplary embodiment of the present invention.
Figure 14B:
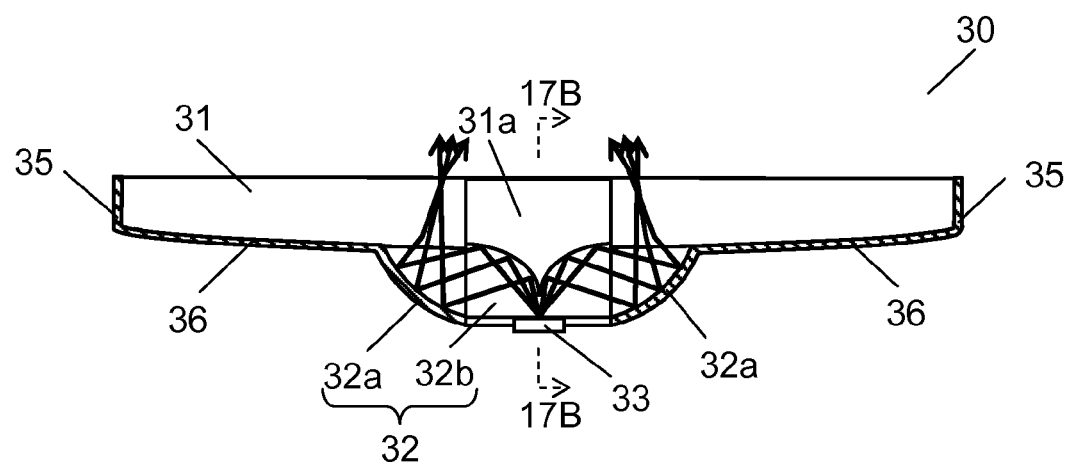
FIG. 14B is a front view schematically showing the optical path when light is emitted in a concentrated manner in the illumination device in accordance with the third exemplary embodiment of the present invention.
Figure 17B:
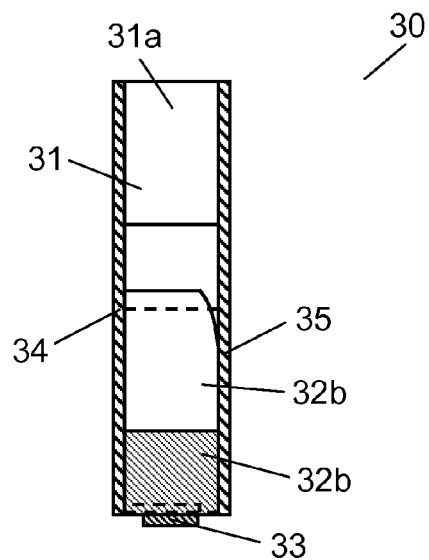
FIG. 17B is a sectional end view taken along line 17B-17B of FIG. 14B in accordance with the third exemplary embodiment of the present invention.

As shown in FIGS. 13B, 14B, and 17B, when light source 33 and movable reflection member 32b of local reflection unit 32 are positioned on the rear surface side (a lower side in the drawings) of light guide unit 31 in space portion 31a, the light from light source 33 is reflected by the front surface of local reflection unit 32, reflected by plate-like reflection member 32a of local reflection unit 32, and thereby emitted in a concentrated manner from the both sides of space 31a of light guide unit 31. Furthermore, since the light emitted from light source 33 dose not propagate in light guide unit 31, it is not annularly emitted.

Figure 18A:
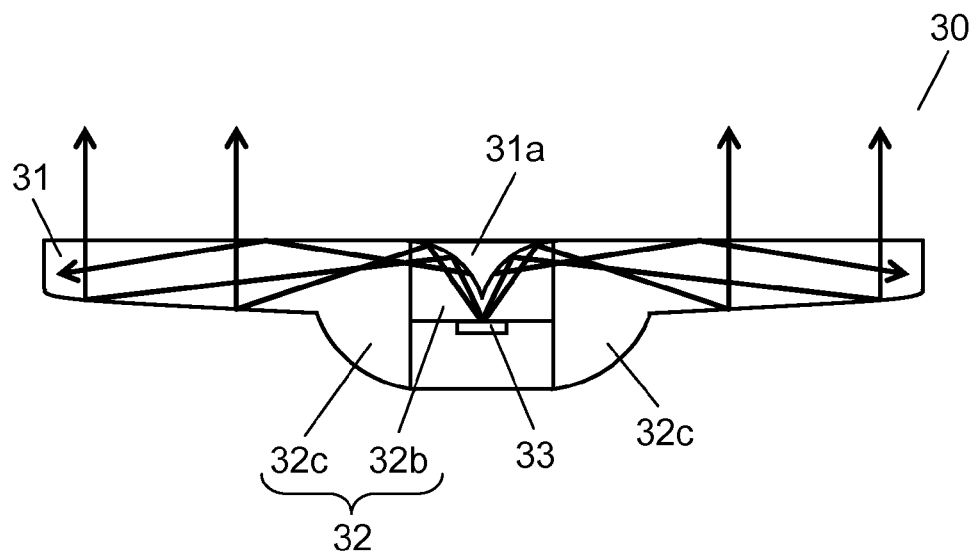
FIG. 18A is a front view schematically showing an optical path when light is annularly emitted in a modified example of the illumination device in accordance with the third exemplary embodiment of the present invention.
Figure 18B:
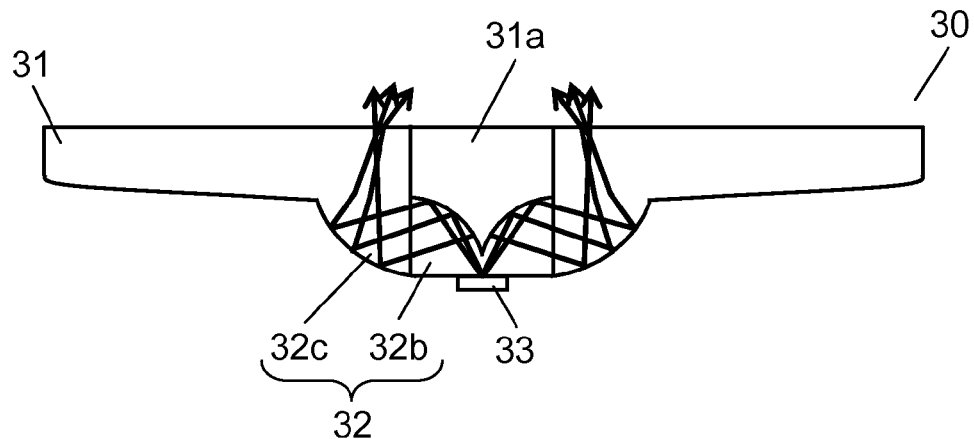
FIG. 18B is a front view schematically showing the optical path when light is emitted in a concentrated manner in a modified example of the illumination device in accordance with the third exemplary embodiment of the present invention.

In this way, illumination device 30 emits light annularly or emits light in a concentrated manner depending upon whether light source 33 and movable reflection member 32b of local reflection unit 32 are positioned on a front surface side of light guide unit 31 in space portion 31a or positioned on a rear surface side, Note here that in illumination device 30 of the third exemplary embodiment, as shown in FIGS. 18A and 18B, local reflection unit 32 may include a pair of expanded reflection units 32c as described in the first exemplary embodiment instead of including plate-like reflection member 32a. Between the pair of expanded reflection units 32c, a space portion that is continuously connected to space portion 31a of light guide unit 31 is provided. The outer peripheral surface of expanded reflection unit 32c is formed in a curved surface that swells so as to widen light guide unit 31 or a linear inclined surface.

In such a modified example of illumination device 30 in accordance with the third exemplary embodiment, as shown in FIG. 18A, when light source 33 and movable reflection member 32b of local reflection unit 32 are positioned on a front surface side (an upper side in the drawings) of light guide unit 31 in space portion 31a, light output from light source 33 is reflected by the front surface of movable reflection member 32b, propagates over the entire periphery of light guide unit 31, and is reflected by the rear surface of light guide unit 31, and the like, and then is annularly emitted from the front surface side of light guide unit 31. Furthermore, since the light output from light source 33 is not reflected by expanded reflection unit 32c of local reflection unit 32, it is not emitted in a concentrated manner.

As shown in FIG. 18B, when light source 33 and movable reflection member 32b of local reflection unit 32 are positioned on the rear surface side of light guide unit 31 (a lower side in the drawings) in space portion 31a, the light output from light source 33 is reflected by the front surface of local reflection unit 32, reflected by expanded reflection unit 32c of local reflection unit 32, and emitted in a concentrated manner from the both surfaces of space portion 31a of light guide unit 31. Furthermore, since the light output from light source 33 dose not propagate in light guide unit 31, it is not annularly emitted.

Fourth Exemplary Embodiment

Figure 19:
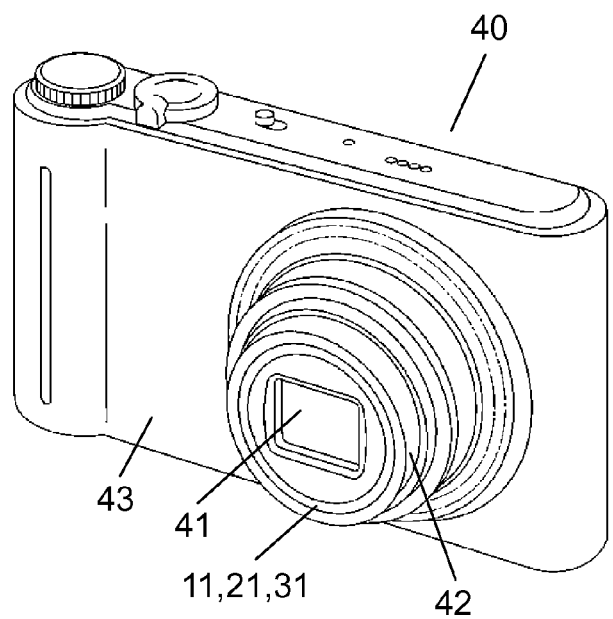
FIG. 19 is a perspective view showing one embodiment of a camera in accordance with a fourth exemplary embodiment of the present invention.
Figure 20:
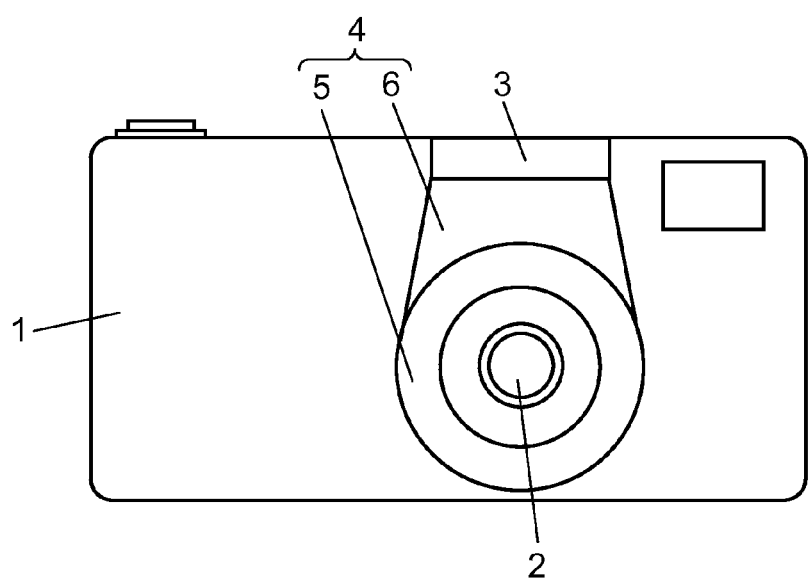
FIG. 20 is a front view showing an example of a conventional camera.

A camera in accordance with an exemplary embodiment of the present invention is described with reference to FIG. 19. Camera 40 includes illumination device 10, 20, 30 in accordance with any of the first to third exemplary embodiments in such a manner that it surrounds lens 41.

Specifically, illumination device 10, 20, 30 corresponds to a tip end portion of lens tube 42 as shown by a solid line or front cover 43 as shown by a virtual line and is provided so as to surround a base end portion of lens tube 42. In any case, illumination device 10, 20, 30 is disposed such that a surface of light guide unit 11, 21, 31 is exposed.

In camera 40, at the time of macro photography, light is annularly emitted from light guide unit 11, 21, 31. When light is emitted from a place that is not distant from lens 41, that is, from the periphery of lens 41, a subject is not easily shaded. Furthermore, when a subject placed in a distant place is illuminated, light is allowed to be emitted from a local emitting portion in a concentrated manner. When light is emitted in a concentrated manner, the light can reach the distant place.

In this way, camera 40 emits light according to photographing conditions, and a subject can be illuminated.

The present invention is not limited to the first to fourth exemplary embodiments and can be modified variously. For example, light source 13, 23, 33 is not limited to LED, and one of LEDs may be allowed to emit light in one direction. In this case, light guide unit 11, 21, 31 is not formed such that the thickness is small in a site that is most distant from light source 13, 23, 33 as shown in the drawing, but it is formed such that the thickness is smallest on a side from which light is not emitted in a site in which light source 13, 23, 33 is disposed.

Furthermore, light guide unit 11, 21, 31 may be configured in such a manner in which two semi-sphere units are combined, and one light source 13, 23, 33 is disposed in each light guide unit 11, 21, 31 so as to emit light for each of the half of the periphery. Furthermore, light source 13, 23, 33 may be provided in two places so as to allow light to be emitted in opposite directions, respectively, so that each light propagates propagate for each of the quarter of the periphery.

Furthermore, in camera 40, by providing lens tube 42 with an annular reflection member, illumination device 10, 20, 30 may not be provided with outer peripheral surface reflection member 15, 25, 35.

As described above, the illumination device of the present invention includes a light guide unit in which an optical path through which light propagates is formed in an annular shape such that the light propagating through the optical path is emitted from a front surface side; a local reflection unit provided on at least a rear surface side of the light guide unit such that light is emitted from only a portion of the front surface side of the light guide unit; and a light source which moves between the light guide unit and the local reflection unit. When the light source is positioned on the light guide unit side, the light output from the light source propagates in the optical path of the light guide unit and is thereby annularly emitted from the front surface side. When the light source is positioned on the local reflection unit side, the light output from the light source is reflected by the local reflection unit and emitted in a concentrated manner from only the portion on the front surface side of the light guide unit.

With this illumination device, the light source can move between the light guide unit and the local reflection unit. When light from the light source positioned on the light guide unit side is allowed to propagate on the entire periphery of the light guide unit, the light is annularly emitted from the surface side of the light guide unit. Furthermore, when the light from the light source positioned on the local reflection unit side is reflected only by the local reflection unit, the light is emitted in a concentrated manner from only a portion on the front surface side of the light guide unit. Note here that the light emitted in a concentrated manner from only the portion at the front surface side of the light guide unit can illuminate a more distant place than the light emitted for illumination annularly from the front surface side of the light guide unit.

Furthermore, in the illumination device of the present invention, the light guide unit may be provided with a groove-shaped, hole-shaped or divided space portion in which the light source is placed.

With this illumination device, by providing the groove-shaped, hole-shaped or divided space portion in which the light source is placed, the light source is allowed to move in the space portion. When the light source is positioned on a deep side of the space portion, that is to say, on the front surface side of the light guide unit, the light from the light source is emitted toward the light guide unit. When the light source is positioned on an opening side of the portion, that is to say, on the rear surface side of the light guide unit, the light from the light source is emitted toward the local reflection unit.

Furthermore, in the illumination device of the present invention, the local reflection unit may be provided by an expanded reflection unit which is expanded integrally from the rear surface of the light guide unit, and which has a peripheral surface that is made to be curved or inclined.

With this illumination device, since the local reflection unit is provided by the expanded reflection unit which is integrally expanded from the rear surface of the light guide unit, the light guide unit and the local reflection unit may be integrally molded.

Furthermore, in the illumination device of the present invention, the local reflection unit may be provided by a plate-like reflection member which is inclined or bends such that it is widened in a direction apart from the rear surface of the light guide unit.

With this illumination device, since the local reflection unit is provided by a plate-like reflection member, the local reflection unit and the light guide unit are provided as different units. Note here that a space is provided between the local reflection unit and the light guide unit.

Furthermore, in the illumination device of the present invention, the local reflection unit includes an expanded reflection unit or a plate-like reflection member, and a movable reflection member which moves in the space portion provided in the light guide unit and in which the light source is disposed. When the light source is positioned in the space portion, the light output from the light source may be reflected from the front surface of the movable reflection member toward the expanded reflection unit or the plate-like reflection member, and reflected from the expanded reflection unit or the plate-like reflection member toward one portion on the front surface side of the light guide unit.

With this illumination device, the light output from the light source that is disposed on the movable reflection member is reflected from the surface of the movable reflection member and emitted to the side. However, when the movable reflection member is positioned on the deep side of the space portion, that is to say, on the light guide unit side, the light propagates in the light guide unit and is emitted annularly from the front surface of the light guide unit. When the movable reflection member is positioned on the expanded reflection unit side or the plate-like reflection member side of the local reflection unit, the light output from the light source is reflected from the front surface of the movable reflection member toward the expanded reflection unit or the plate-like reflection member, and further reflected from the expanded reflection unit or the plate-like reflection member toward one portion of the front surface side of the light guide unit, and emitted from the front surface side of the light guide unit in a concentrated manner.

Furthermore, in the illumination device of the present invention, the light guide unit may be formed in such a manner that a thickness from the rear surface to the front surface is reduced as a distance from the light source side is larger.

With this illumination device, since the light guide unit is made to be thinner as the distance from the light source is larger, the light is emitted from the light source and propagating in the light guide unit is reflected by the rear surface of the light guide unit and emitted from the front surface.

Furthermore, the illumination device of the present invention may include a peripheral surface reflection member on the inner peripheral surface and/or the outer peripheral surface of the light guide unit.

With this illumination device, the light propagating from the light source through the light guide unit is reflected by the peripheral surface reflection member provided on the inner peripheral surface and/or the outer peripheral surface of the light guide unit and propagates over the entire periphery of the light guide unit without being emitted from the inner peripheral surface and/or the outer peripheral surface of the light guide unit.

Furthermore, in the illumination device of the present invention, the light source may include two LEDs combined in the opposite direction.

With this illumination device, since the light source may include two LEDs combined in the opposite direction, when each one of the LEDs propagates at least only a half of the periphery of the light guide unit, the light propagates over the entire periphery.

Furthermore, a camera of the present invention includes the above-mentioned illumination device in such a manner that it surrounds a lens.

Since this camera includes the above-mentioned illumination device in such a manner that it surrounds a lens, it can be used by switching the illumination device such that illumination is carried out annularly from the light guide unit when illumination is carried out in macro photography, and light is emitted from only a portion on the front surface side of the light guide unit in a concentrated manner when illumination of a distant place is carried out. Since the illumination device is disposed in such a manner that it surrounds the lens, in macro photography, shade does not easily occur. Furthermore, the light emitted in a concentrated manner from only the portion on the front surface side of the light guide unit can illuminate a distant place, and thus it is used for normal photography.

INDUSTRIAL APPLICABILITY

An illumination device in accordance with the present invention can be effectively used as a component constituting a digital still camera.

REFERENCE MARKS IN DRAWINGS 10 illumination device
11 light guide unit
11a space portion
12 local reflection unit (expanded reflection unit)
13 light source
14 peripheral surface reflection member
15 peripheral surface reflection member
20 illumination device
21 light guide unit
21a space portion
22 local reflection unit (plate-like reflection member)
23 light source
24 peripheral surface reflection member
25 peripheral surface reflection member
26 rear surface reflection member
30 illumination device
31 light guide unit
31a space portion
32 local reflection unit
32a plate-like reflection member
32b movable reflection member
32c expanded reflection unit
33 light source
34 peripheral surface reflection member
35 peripheral surface reflection member
36 rear surface reflection member
40 camera
41 lens

The invention claimed is:

1. An illumination device comprising:
a light guide unit in which an optical path through which light propagates is formed in an annular shape such that the light propagating through the optical path is emitted from a front surface side of the light guide unit;
a local reflection unit provided on at least a rear surface side of the light guide unit such that light is emitted from only a portion of the front surface side of the light guide unit; and
a light source which moves between the light guide unit and the local reflection unit,
wherein when the light source is positioned on the light guide unit side, the light output from the light source propagates in the optical path of the light guide unit and is annularly emitted from the front surface side; and when the light source is positioned on the local reflection unit side, the light output from the light source is reflected by the local reflection unit and emitted in a concentrated manner from only the portion on the front surface side of the light guide unit.

2. The illumination device of claim 1,
wherein the light guide unit is provided with a groove-shaped, hole-shaped or divided space portion in which the light source is placed.

3. The illumination device of claim 1,
wherein the local reflection unit is provided by an expanded reflection unit which is expanded integrally from the rear surface of the light guide unit, and which has a peripheral surface that is made to be curved or inclined.

4. The illumination device of claim 3,
wherein the local reflection unit includes the expanded reflection unit and a movable reflection member which moves in the space portion provided in the light guide unit and in which the light source is disposed, and
wherein when the light source is positioned on the rear surface side of the light guide unit in the space portion, the light output from the light source is reflected from the surface of the movable reflection member toward the expanded reflection unit, and is further reflected from the expanded reflection unit toward the portion on the front surface side of the light guide unit.

5. The illumination device of claim 1,
wherein the local reflection unit is provided by a plate-like reflection member which is inclined or bends such that it is widened in a direction apart from the rear surface of the light guide unit.

6. The illumination device of claim 5,
wherein the local reflection unit includes the plate-like reflection member and a movable reflection member which moves in the space portion provided in the light guide unit and in which the light source is disposed, and
wherein when the light source is positioned on the rear surface side of the light guide unit in the space portion, the light output from the light source is reflected from the surface of the movable reflection member toward the plate-like reflection member, and is further reflected from the plate-like reflection member toward the portion on the front surface side of the light guide unit.

7. The illumination device of claim 1,
wherein the light guide unit is made to have a smaller thickness between the rear surface and the front surface as a distance from the light source is larger.

8. The illumination device of claim 1,
wherein a peripheral surface reflection member is provided on at least one of an inner peripheral surface and an outer peripheral surface of the light guide unit.

9. The illumination device of claim 1,
wherein the light source includes two LEDs combined in an opposite direction.

10. A camera comprising an illumination device of claim 1 in such a manner that it surrounds a lens.

* * * * *